United States Patent
Akiyama

(10) Patent No.: US 7,438,103 B2
(45) Date of Patent: Oct. 21, 2008

(54) PNEUMATIC TIRE WITH SIDE REINFORCEMENT RUBBER LAYER AND TREAD REINFORCEMENT RUBBER LAYER

(75) Inventor: Ichiro Akiyama, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 47 days.

(21) Appl. No.: 10/548,168

(22) PCT Filed: Mar. 24, 2004

(86) PCT No.: PCT/JP2004/004052

§ 371 (c)(1),
(2), (4) Date: Sep. 7, 2005

(87) PCT Pub. No.: WO2004/089657

PCT Pub. Date: Oct. 21, 2004

(65) Prior Publication Data

US 2006/0169378 A1    Aug. 3, 2006

(30) Foreign Application Priority Data

Apr. 1, 2003    (JP)    ............................. 2003-097662

(51) Int. Cl.
*B60C 17/00*    (2006.01)
*B60C 9/18*    (2006.01)
(52) U.S. Cl. ...................... 152/517; 152/532
(58) Field of Classification Search .................. 152/517
See application file for complete search history.

(56) References Cited

U.S. PATENT DOCUMENTS

| | | | |
|---|---|---|---|
| 6,142,204 A | * | 11/2000 | Omoteda et al. ............ 152/517 |
| 6,701,986 B2 | * | 3/2004 | Tanaka .................... 152/517 X |

FOREIGN PATENT DOCUMENTS

| | | | | |
|---|---|---|---|---|
| EP | 1 022 162 A1 | * | 7/2000 | |
| JP | 2001018611 A | * | 1/2001 | |
| JP | 2002012004 A | * | 1/2002 | |

OTHER PUBLICATIONS

JP-2002-12004-A abstract, Jan. 15, 2002, Sumitomo Rubber Industries, Ltd.
JP-10-151917-A abstract, Jun. 9, 1998, Sumitomo Rubber Ind., Ltd.
International Search Report Jun. 22, 2004.

* cited by examiner

*Primary Examiner*—Adrienne C Johnstone
(74) *Attorney, Agent, or Firm*—Greer, Burns & Crain, Ltd.

(57) ABSTRACT

A pneumatic tire that improves riding comfort under normal driving conditions, and improves durability under run-flat conditions, while inhibiting a weight increase. This pneumatic tire includes a carcass layer and belt layer. The carcass layer contains two or more carcass plies constituted of organic fiber cords. The belt layer contains at least two belt plies, each arranged radially outwards from the carcass layer of the tire in a tread part. The tread part includes a tread reinforcement rubber layer that is located between the radially outer carcass ply and the radially inner belt ply. Each side wall part includes a side reinforcement rubber layer having a crescent-shaped cross-section, located inwards from the axially inner carcass ply. At least one of the carcass plies constituting the carcass layer is folded back about bead cores respectively of bead parts.

5 Claims, 1 Drawing Sheet

PNEUMATIC TIRE WITH SIDE REINFORCEMENT RUBBER LAYER AND TREAD REINFORCEMENT RUBBER LAYER

TECHNICAL FIELD

The present invention relates to a pneumatic tire capable of running flat-out. More specifically, the present invention relates to a pneumatic tire, whose riding comfort under normal driving conditions is improved while an increase in weight thereof is inhibited as much as possible, and whose durability under run-flat driving conditions is improved.

BACKGROUND ART

As pneumatic tires capable of running flat-out, a pneumatic tire, whose side walls are provided respectively with reinforcement rubber layers having a crescent-shaped cross section, which inhibits the tire from being flexed vertically on the basis of the reinforcement rubber layers when the tire is flat, and whose tire casing is accordingly prevented from being destroyed is known.

In a case, however, where the side walls are provided respectively with the crescent-shaped reinforcement rubber layers, this brings about the following disadvantages. The tire increases in weight to a large extent in comparison with regular tires. In addition, an increase in vertical springs makes the riding comfort worse. Furthermore, in a case where the side walls are provided with the respective crescent-shaped reinforcement rubber layers, the center portion of the tread part becomes depressed inwards in the radial direction of the tire under run-flat driving conditions, thus causing a buckle phenomenon. This increases load on each of shoulder parts. This is a factor of reducing the durability of the tire.

Against this background, the followings have been proposed with regard to the tires capable of running flat-out (see Japanese patent application Kokai publication No. Hei 10-151917, for example). A carcass layer is formed of three or more carcass plies. A side reinforcement rubber layer having a crescent-shaped cross section is arranged between each neighboring two of the carcass plies in each of the side wall parts. In addition, a tread reinforcement rubber layer is arranged between each neighboring two of the carcass plies in the tread part.

In the case of such a pneumatic tire, the interposition of the tread reinforcement rubber layer and the side reinforcement rubber layers between each neighboring two of the carcass plies increases bending rigidities respectively in the tread part and the side wall parts, accordingly increasing a mileage in which the motor vehicle can continue running flat-out. Furthermore, if the side reinforcement rubber layers were made thinner, the riding comfort can be improved.

However, in the case of the pneumatic tire for which three or more carcass plies are used, effects of reinforcement which would otherwise be brought about by the carcass plies are not utilized fully. For this reason, if effects of further improved durability are intended to be obtained, the weight is inevitably increased to a large extent.

DISCLOSURE OF THE INVENTION

An object of the present invention is to provide a pneumatic tire, whose riding comfort under normal driving conditions is improved while an increase in weight thereof is inhibited as much as possible, and whose durability under run-flat driving conditions is improved.

The pneumatic tire according to the present invention for the purpose of solving the aforementioned object relates to a pneumatic tire including: a carcass layer which extends from a tread part to bead parts respectively via two side walls, and which is formed of not more than two carcass plies constituted of organic fiber cords; and a belt layer formed of at least two belt plies which are arranged outwards from the carcass layer in the tread part in the radial direction of the tire. The tread part includes a tread reinforcement rubber layer outwards from a carcass ply which is located in the outermost position in the radial direction of the tire out of the carcass plies, and inwards from a belt ply which is located in the innermost position in the radial direction of the tire out of the belt plies. Each of the side wall parts includes a side reinforcement rubber layer having a crescent-shaped cross section inwards from a carcass ply which is located in the innermost position in the axis direction of the tire out of the carcass plies. At least one of the carcass plies constituting the carcass layer has a structure which makes the carcass ply folded back about bead cores arranged respectively in bead parts.

The aforementioned configuration makes all of the carcass plies arranged inwards from the tread reinforcement rubber layer in the radial direction of the tire, and outwards from the side reinforcement rubber layer in the axis direction of the tire. This means that the carcass plies exist in all of the portions of the tire which are stretched while the motor vehicle is driving under a condition where the air pressure of the tire is extremely low or under a condition where the air pressure of the tire is 0 kPa (hereinafter referred to as "under run-flat driving conditions"), in other words, in a case where each of the reinforcement rubber layers is bent. The presence of all of the carcass plies in the stretched portions makes it possible to efficiently improve bending rigidities respectively of the tread part and the side wall parts, the bending rigidities which are applied under run-flat driving conditions. In addition, the structure, which makes at lease one of the carcass plies constituting of the carcass layer folded back about the bead cores, causes the carcass plies to effectively function as an anti-stretch material, thus contributing to improving the bending rigidities to a large extent.

As a result, the tread reinforcement rubber layer inhibits the buckle phenomenon from occurring in the tread part under the run-flat driving conditions. In addition, the side reinforcement rubber layers inhibit the respective side walls from being flexed vertically. This makes adequate a contact patch shape which the tire takes on, and improves the driving stability, accordingly increasing the durability. Furthermore, if an effective reinforcement structure were formed in the aforementioned manner, this enables each of the side reinforcement rubber layers to be made thinner. Accordingly, this makes it possible to improve riding comfort under normal driving conditions whereas an increase in weight of the pneumatic tire is inhibited as much as possible.

If a more effective reinforcement structure is intended to be formed in the case of the present invention, the reinforcement structure may satisfy the following criteria. Specifically, it is preferable that the width of the tread reinforcement rubber layer be 60 to 100% of a belt ply which is located in the innermost position in the radial direction of the tire out of the belt plies. In addition, it is preferable that the thickness of the tread reinforcement rubber layer be gradually decreased outwards from the center portion in the axis direction of the tire, and that the thickness of the tread reinforcement rubber layer be 2 to 8 mm in the center position in the axis direction of the tire. Furthermore, with regard to rubber compositions to be used for the tread reinforcement rubber layer and the side reinforcement rubber layers, it is preferable that their hardnesses (JIS-A) be 50 to 95, that their loss tangents tan δ be 0.05 to 0.3, and that their 100% moduli be 0.5 to 15.0 MPa

BEST MODES FOR CARRYING OUT THE INVENTION

Figure 1:
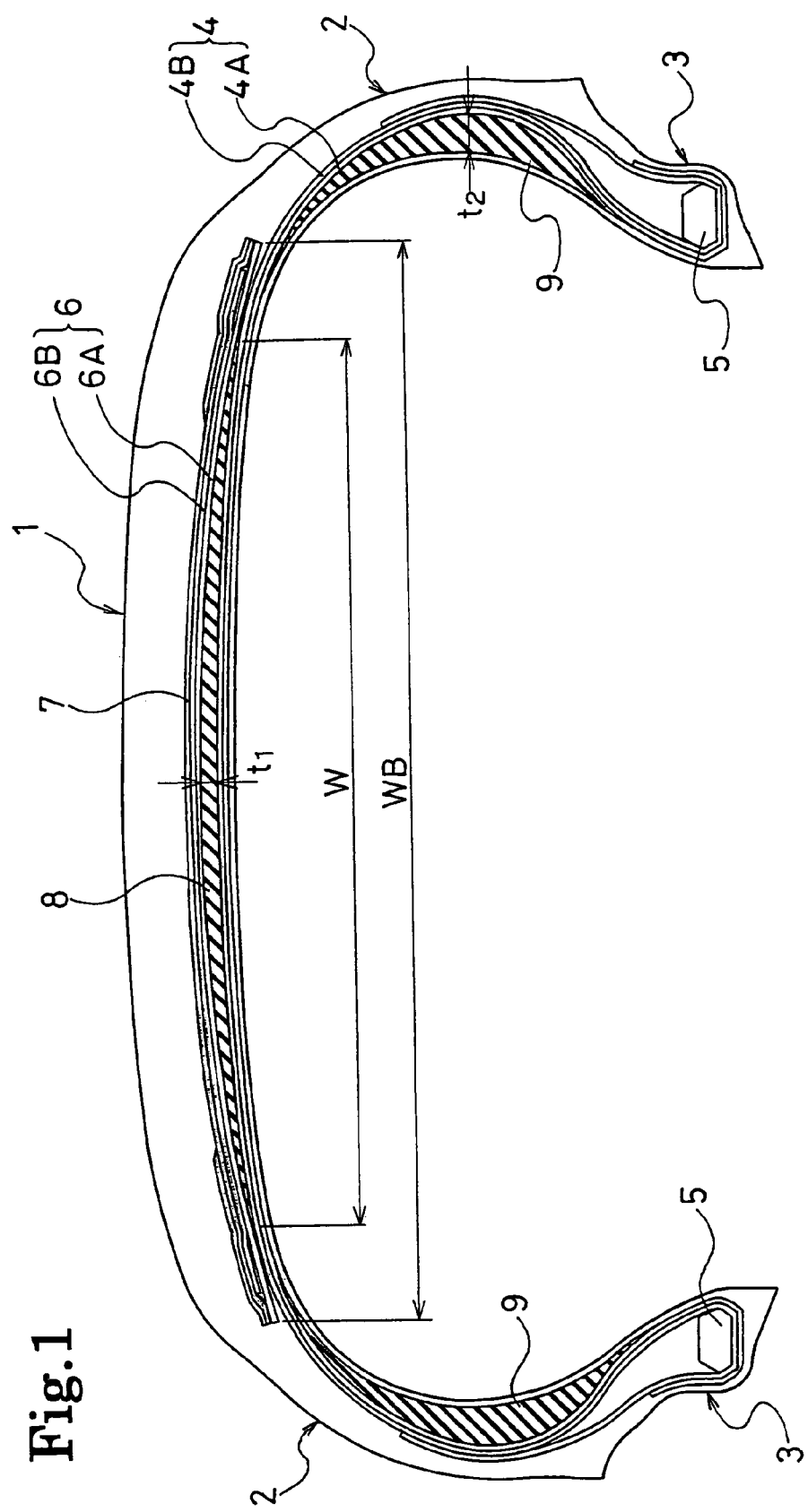
FIG. 1 is a cross sectional view taken along a meridian, showing a pneumatic tire according to an embodiment of the present invention.

Hereinafter, detailed descriptions will be provided for a configuration of the present invention with reference to the attached drawings.

FIG. 1 shows a pneumatic titer according to an embodiment of the present invention. In FIG. 1, reference numeral 1 denotes a tread part; 2, a side wall part; and 3, a bead part. A carcass layer 4 is laid between a pair consisting of a left bead 3 and a right bead 3. The carcass layer 4 is constituted of two carcass plies 4A and 4B, each of which includes a plurality of organic fiber cords arranged in parallel with one another. A tilt angle of each of the organic fiber cords constituting the carcass plies 4A and 4B to the circumferential direction of the tire is 70 to 90 degrees. Each of these carcass plies 4A and 4B is folded back from the inside to the outside of the tire about each of the bead cores 5, which are arranged respectively in the bead parts 3.

A belt layer 6 is embedded in a position outwards from the carcass layer 4 in the tread part 1 in the radial direction of the tire. The belt layer 6 is constituted of two belt plies 6A and 6B, each of which includes a plurality of reinforcement cords arranged in parallel with one another. Each of the reinforcement cords of the belt plies 6A and 6B tilts at an angle of 15 to 35 degrees to the circumferential direction of the tire. In addition, the reinforcement cords of the belt plies 6A and 6B are arranged in a way that the reinforcement cords cross one another. Furthermore, a belt cover layer 7 is provided to a position outwards from the belt layer 6 in the radial direction of the tire. The belt cover layer 7 is formed through aligning reinforcement cords in the circumferential direction of the tire.

In the tread part 1, a tread reinforcement rubber layer 8 is inserted in a position outwards from the carcass ply 4B in the radial direction of the tire and inwards from the belt ply 6A in the radial direction of the tire. The carcass ply 4B is located in the outermost position in the radial direction of the tire out of the carcass plies 4A and 4B. The belt ply 6A is located in the innermost position in the radial direction of the tire out of the belt plies 6A and 6B. The width W of the tread reinforcement rubber layer 8 is 60 to 100% of the width WB of the belt ply 6A, which is located in the innermost position in the radial direction of the tire out of the belt plies 6A and 6B. If the width W of the tread reinforcement rubber layer 8 is smaller than 60% of the width WB of the belt ply 6A, the reinforcement effect becomes insufficient. By contrast, if the width W of the tread reinforcement rubber layer 8 is larger than 100% of the width WB of the belt ply 6A, the riding comfort is decreased.

The thickness of the tread reinforcement rubber layer 8 gradually decreases outwards from the center portion in the axis direction of the tire. The thickness $t_1$ of the tread reinforcement rubber layer 8 is 2 to 8 mm in the center portion in the width direction of the tire. This effectively inhibits the center portion of the tread part 1 from becoming depressed inwards in the radial direction of the tire under the run-flat driving conditions. If the thickness $t_1$ of the tread reinforcement rubber layer 8 is smaller than 2 mm, the reinforcement effect becomes insufficient. On the contrary, if the thickness $t_1$ of the tread reinforcement rubber layer 8 is larger than 8 mm, the riding comfort is decreased.

On the other hand, in each of the side wall parts, a side reinforcement rubber layer 9 having a crescent-shaped cross section is inserted inwards from the carcass ply 4A which is located in the innermost position in the axis direction of the tire out of the carcass plies. The thickness $t_2$ of the side reinforcement rubber layer 9 gradually decreases from the center portion in the radial direction of the tire towards the tread part and the bead parts. The thickness $t_2$ of each of the side reinforcement rubber layers 9 is 4 to 12 mm in a position which makes the width of the tire maximum. If the thickness $t_2$ of each of the side reinforcement rubber layers 9 is smaller than 4 mm, the reinforcement effect becomes insufficient. On the contrary, if the thickness $t_2$ of each of the side reinforcement rubber layers 9 is larger than 12 mm, the riding comfort is decreased.

In the case of this pneumatic tire, each of the side wall parts 2 which have been reinforced respectively with the side reinforcement rubber layers 9 is deformed in a way that the side wall part 2 extends outwards in the axis direction of the tire, while the motor vehicle is running flat-out. In addition, the tread part 1 which has been reinforced with the tread reinforcement rubber layer 9 is deformed in a way that the center portion of the tread part 1 becomes depressed inwards in the radial direction of the tire, while the motor vehicle is running flat-out. At this point, all of the carcass plies 4A and 4B are present in a portion inwards from the tread reinforcement rubber layer 8 in the radial direction of the tire, the portion onto which the tensile stress works. At the same time, all of the carcass plies 4A and 4B are present in a portion outwards from each of the side reinforcement rubber layers 9 in the axis direction of the tire, the portion onto which the tensile stress works. This enables the bending rigidities respectively in the tread part 1 and the side wall parts 2 to be increased effectively while the motor vehicle is running flat-out.

It should be noted that, while the motor vehicle is running flat-out, each of the carcass plies 4A and 4B is loaded with a large tensile force. This requires at least one of these carcass plies 4A and 4B to have a structure which makes the carcass ply folded back about the bead cores 5. The bead lock structure thus made enables at least one of the carcass plies 4A and 4B to effectively function as an anti-tension member.

In the case of the aforementioned pneumatic tire, the tread reinforcement rubber layer 8 inhibits a buckle phenomenon of the tread part 1, and each of the side reinforcement rubber layers 9 inhibits the side wall part 2 from being flexed vertically while the motor vehicle is running flat-out. This makes it possible to make adequate the contact patch shape which the tire takes on, and enables the driving stability to be improved. In addition, this enables the durability to be improved. Furthermore, each of the side reinforcement rubber layers 9 can be made thinner than that of a conventional pneumatic tire. This enables the riding comfort under normal driving conditions to be improved while an increase in weight of the pneumatic tire is inhibited as much as possible.

A rubber composition which is used for the tread reinforcement rubber layer 8 can be either the same as or different from a rubber composition which is used for each of the side reinforcement rubber layers 9. In any case, with regard to the rubber compositions to be used for the reinforcement rubber layers 8 and 9, it is preferable that their hardnesses (JIS-A) be 50 to 95, that their loss tangents tan δ be 0.05 to 0.3, and that their 100% moduli at a temperature of 20° C. be 0.5 to 15.0 MPa. Incidentally, the loss tangents tan δ were measured by use of a viscoelastic spectrometer under the following conditions. The temperature was 20° C., the frequency was 20 Hz, the initial distortion was 10%, and the dynamic distortion was ±2%. If the physical properties of the rubber compositions to be used for the reinforcement rubber layers 8 and 9 were defined as described above, this enables a preferable reinforcement effect to be obtained without sacrificing the riding comfort.

Detailed descriptions have been provided for the preferred embodiment of the present invention. However, it should be understood that various modifications to, substitutions for, and replacements with, the preferred embodiment can be carried out as long as the modifications, the substitutions and the replacements do not depart from the spirit of, or the scope of, the present invention defined by the attached claims.

Next, descriptions will be provided for results respectively of experiments on tires which were actually manufactured. Pneumatic tires with a tire size of 225/50R17 were manufactured for conventional examples 1 to 3 and examples 1 to 3 of the present invention through changing the respective reinforcement structures in the tread part and in the side wall parts as mentioned below.

CONVENTIONAL EXAMPLE 1

A pneumatic tire (reference tire) was manufactured which included a carcass layer and a belt layer. The carcass layer was formed of two carcass plies, each of which extended from the tread part to the bead parts respectively via the side wall parts, and each of which was constituted of organic fiber cords. The belt layer was formed of two belt plies arranged outwards from the carcass layer in the radial direction of the tire in the tread part. In other words, this reference tire was a normal tire which was not classified as a run-flat tire.

CONVENTIONAL EXAMPLE 2

A pneumatic tire was manufactured which had the same structure as the conventional example 1 did, except that, in each of the side wall parts, a side reinforcement rubber layer having a crescent-shaped cross section was arranged inwards from a carcass ply which was located in the innermost position in the axis direction of the tire out of the carcass plies.

CONVENTIONAL EXAMPLE 3

A pneumatic tire was manufactured which had the same structure as the conventional example 1 did, except that a carcass layer constituted of three carcass plies was formed, that a side reinforcement rubber layer having a crescent-shaped cross section was arranged between each neighboring two of the carcass plies in each of the side wall parts, and that a tread reinforcement rubber layer was arranged between each neighboring two of the carcass plies in the tread part. The width of the tread reinforcement rubber layer was gradually decreased outwards from the center portion in the axis direction of the tire. The thickness of the tread reinforcement rubber layer was 3 mm in the center portion in the width direction of the tire.

EXAMPLE 1

A pneumatic tire was manufactured which had the same structure as the conventional example 1 did, except that: in a tread part, a tread reinforcement rubber layer was arranged outwards from a carcass ply which was located in the outermost position in the radial direction of the tire out of the carcass plies, and inwards from a belt ply which was located in the innermost position in the radial direction of the tire out of the belt plies; in each of the side wall parts, a side reinforcement rubber layer having a crescent-shaped cross section was arranged inwards from a carcass ply which was located in the innermost position in the axis direction of the tire. The thickness of the tread reinforcement rubber layer was gradually decreased outwards from the center portion in the axis direction of the tire. The thickness of the tread reinforcement rubber layer was 3 mm in the center portion in the width direction of the tire. In addition, the weight of the tire was the same as that of the tire of the conventional example 2.

EXAMPLE 2

A pneumatic tire was manufactured which had the same structure as the example 1 did, except that the volume of the side reinforcement rubber layer was reduced.

EXAMPLE 3

A pneumatic tire was manufactured which had the same structure as the example 2 did, except that the thickness of the tread reinforcement rubber layer was 1 mm uniformly throughout the tread reinforcement rubber layer.

With regard to each of these experimental tires, a mileage in which the motor vehicle was able to continue running flat-out was measured, and the riding comfort was assessed, while the weight of the tire was measured. Table 1 shows the results.

Mileage in which the Motor Vehicle Was Able to Continue Running Flat-out:

Each of the experimental tires was mounted onto a wheel whose rim size was 17×7½JJ. Then, each of the experimental tires thus mounted was installed to the front right wheel of a rear-wheel-drive motor vehicle while the tire was in a state of having an air pressure of 0 kPa with a valve core removed. The motor vehicle thus installed with each of the experimental tires ran at a speed of 90 km/h counterclockwise in a circuit course shaped like an ellipse. With regard to each of the experimental tires, a mileage was measured until the test driver felt abnormal vibrations due to a malfunction in the tire and terminated the test run.

Riding Comfort:

Each of the experimental tires was mounted onto a wheel whose rim size was 17×7½JJ. Then, each of the experimental tires thus mounted was installed to all of the wheels of the motor vehicle while the tire was in a state of having an air pressure of 230 kPa. Thereafter, with regard to each of the experimental tires, a feel test was carried out by the test driver. Results of the assessment were shown with a 5-point scale. The larger the point is, the better riding comfort the experiment tire has.

TABLE 1

|  |  | CONVENTIONAL EXAMPLE 1 | CONVENTIONAL EXAMPLE 2 | CONVENTIONAL EXAMPLE 3 | EXAMPLE 1 | EXAMPLE 2 | EXAMPLE 3 |
|---|---|---|---|---|---|---|---|
| NUMBER OF CARCASS PLIES | | 2 | 2 | 3 | 2 | 2 | 2 |
| TREAD REINFORCEMENT RUBBER LAYER | THICKNESS $t_1$ (mm) | — | — | 3 | 3 | 3 | 1 |
| | CROSS-SECTIONAL AREA (mm$^2$) | — | — | 167 | 167 | 167 | 160 |
| | WEIGHT (kg) | — | — | 0.29 | 0.29 | 0.29 | 0.28 |
| SIDE REINFORCEMENT RUBBER LAYER | THICKNESS $t_2$ (mm) | — | 10 | 6 | 8 | 6 | 6 |
| | CROSS-SECTIONAL AREA (mm$^2$) | — | 596 × 2 | 366 × 2 | 481 × 2 | 366 × 2 | 366 × 2 |
| | WEIGHT (kg) | — | 2.00 | 1.23 | 1.62 | 1.23 | 1.23 |
| TIRE WEIGHT (kg) | | 11.5 | 13.5 | 13.8 | 13.4 | 13.0 | 13.0 |
| RUN-FLAT MILEAGE (km) | | — | 200 | 250 | 300 | 250 | 220 |
| RIDING COMFORT | | 3 | 2.5+ | 3− | 3− | 3 | 3 |

As learned from Table 1, the tires according to Examples 1 to 3 were able to improve their riding comfort which were felt under normal driving conditions while their increases in weight were inhibited as much as possible. In addition, the tires according to Examples 1 to 3 were able to improve their durability under run-flat driving conditions.

INDUSTRIAL APPLICABILITY

The present invention can be effectively used in the tire manufacturing industry, and additionally in the car manufacturing industry.

What is claimed is:

1. A pneumatic tire including:
a carcass layer formed of two carcass plies, defined as an outermost carcass ply and an innermost carcass ply, each of which extends along an entirety of a tread part to bead parts respectively via side wall parts and each of which are constituted of organic fiber cords; and
a belt layer formed of at least two belt plies which are arranged outwards from the carcass layer in a radial direction of the tire in the tread part,
wherein the tread part includes a tread reinforcement rubber layer outwards from the outermost carcass ply in the radial direction of the tire and inwards from the innermost belt ply in the radial direction of the tire, and the tread reinforcement rubber layer directly contacts with the outermost carcass ply, and further wherein both the outermost carcass ply and the innermost carcass ply extend along the full axial width of the tread reinforcement rubber layer,
wherein the side wall part includes a side reinforcement rubber layer, which has a crescent-shaped cross section, inwards from the innermost carcass ply in an axial direction of the tire, the side reinforcement rubber layer directly contacts with the innermost carcass ply,
wherein the carcass plies constituting the carcass layer have a structure in which the carcass plies are folded back from inside to outside of the tire about bead cores arranged respectively in the bead parts, and the folded ends of the carcass plies are disposed in a position outwards from ends of the belt plies in the axial direction of the tire, and
wherein a width of the tread reinforcement rubber layer is 60 to 100% of a width of the belt ply which is located in the innermost position in the radial direction of the tire.

2. The pneumatic tire according to claim 1, wherein a thickness of the tread reinforcement rubber layer gradually decreases outwards from a center portion in the axis direction of the tire, and the thickness in the center portion in the axis direction is 2 to 8 mm.

3. The pneumatic tire according to claim 1, wherein, with regard to compositions of rubbers to be used respectively for the tread reinforcement rubber layer and the side reinforcement rubber layer,
hardnesses (JLS-A) thereof are 50 to 95,
loss tangents tan δ thereof are 0.05 to 0.3, and 100% moduli thereof are 0.5 to 15.0 MPa.

4. The pneumatic tire according to claim 1, wherein a thickness of the side reinforcement rubber layer gradually decreases towards the tread and the bead from a center portion in the radial direction of the tire, and a thickness of the side reinforcement rubber layer is 4 to 12 mm in a position which makes a width of the tire the maximum.

5. The pneumatic tire according to claim 1, wherein both the outermost and innermost carcass plies are generally concave, in the tread part, when considered from radially inside the tire.

* * * * *